Jan. 27, 1942.  A. CRAIGON  2,271,287
SKIN COVERED STRUCTURE
Filed Feb. 10, 1940  2 Sheets-Sheet 1
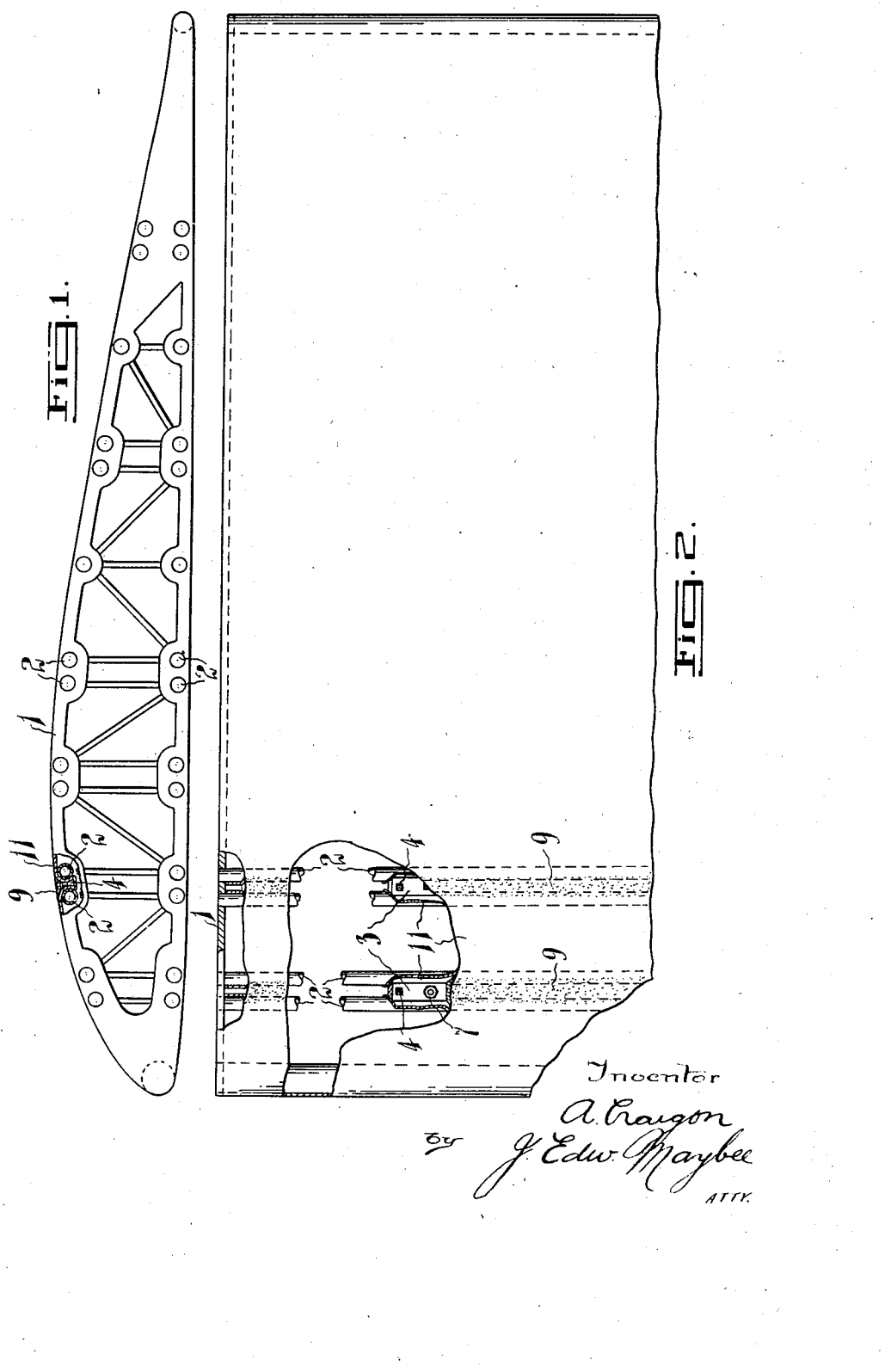
Inventor
A. Craigon
by J. Edw. Maybee
ATTY.

Jan. 27, 1942.  A. CRAIGON  2,271,287
SKIN COVERED STRUCTURE
Filed Feb. 10, 1940   2 Sheets-Sheet 2

Inventor
A. Craigon
by J. Edw. Maybee
ATTY.

Patented Jan. 27, 1942

2,271,287

UNITED STATES PATENT OFFICE 2,271,287

SKIN COVERED STRUCTURE

Adam Craigon, Toronto, Ontario, Canada

Application February 10, 1940, Serial No. 318,361

10 Claims. (Cl. 189—34)

This invention relates to skeleton structures covered with a skin fabric, such as aeroplane wings, fuselages, field hangars and the like, and my object is to devise a light, strong construction which will eliminate a large portion of the labor employed in fastening the skins in position on the underlying framework.

Figure 4:
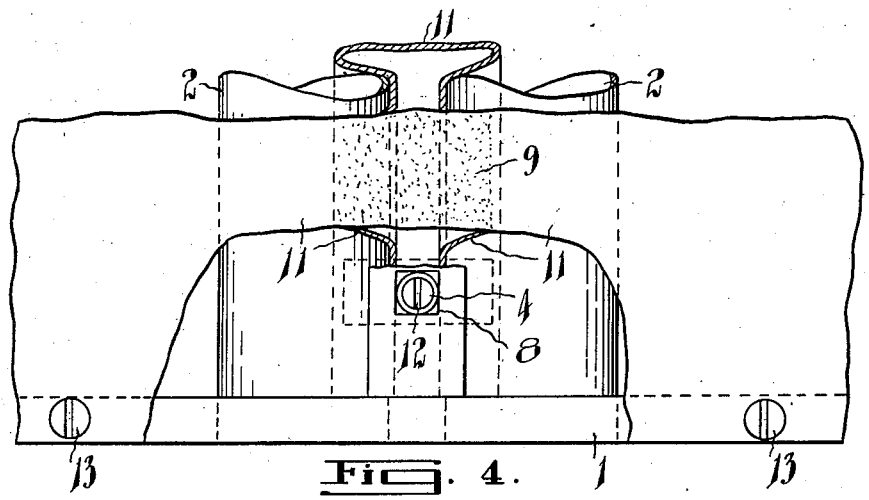
Figure 3:
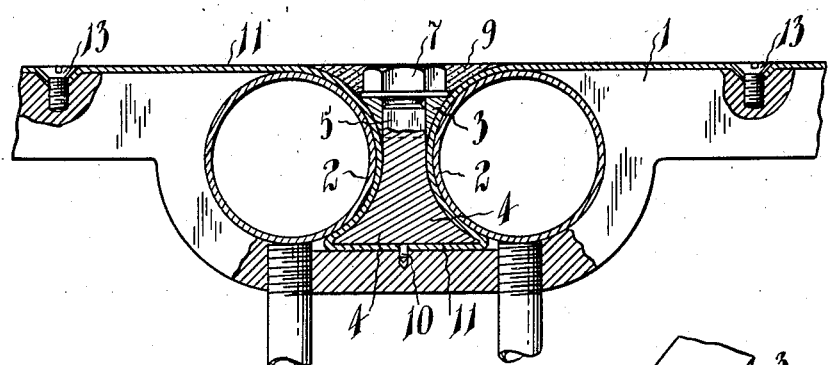
Figure 6:
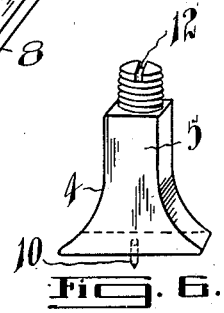
Figure 5:
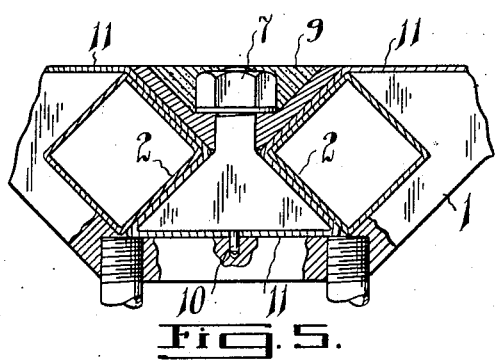

The construction whereby my object is attained is hereinafter fully described, by way of example, and is illustrated in the accompanying drawings in which Fig. 1 is an end view of an aeroplane wing constructed in accordance with my invention;

Fig. 2 a plan view of the same;

Fig. 3 an enlarged sectional detail of the transverse ribs showing the fastening means and skin fabric in place;

Fig. 4 a plan view of the same;

Fig. 5 a view similar to Fig 3 showing hollow ribs of square cross-section;

Fig. 6 a perspective view of one of the wedge bolts; and

Figure 7:
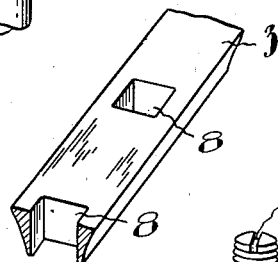

Fig. 7 a perspective view of part of a filler strip.

In the drawings like numerals of reference indicate corresponding parts in the different figures.

In the drawings, 1 represents frame members or bulkheads defining the shape of the wing from the leading edge to the trailing edge and which are formed as usual of open truss work though a solid perforated plate might also be employed. As many of these frame members are provided as is necessary to give the wing the necessary strength and shape.

2 are pairs of transverse ribs, preferably tubular, which are connected with the aforesaid frame members in any suitable manner and which give longitudinal strength to the wing. These transverse ribs, it will be noted, are convex, at least on their adjacent sides, preferably being circular in cross-section, though other shapes of cross-section might be employed such as square. See Fig. 5 of the drawings. The effect of this construction is to form outer bevelled portions and inner undercut portions to the sides of the ribs, the space between the ribs being constricted between the upper and lower edges of the ribs.

The fabric 11 is stretched round the framework of the wing in any suitable manner and is secured in place by the construction which I will now describe. Wedge-like filler strips 3 are provided. Each filler strip is adapted to fit between and extend longitudinally of one of the pairs of tubes as shown in Fig. 3 of the drawings. 4 are wedge-like bolts, comprising a threaded stem and a wedge shaped head the wedge heads of which fit between the ribs 2 at their inner sides. The stems and heads of these wedge bolts are narrower than the narrowest part of the space between the ribs in one dimension, and the heads are wider than said part in another dimension as shown in Fig. 6 so that they may be inserted between the ribs and then turned to the position shown in Fig. 3 of the drawings with their sides bearing against the undercut sides of the ribs. The necks 5 of these bolts are preferably squared or flattened so that they will not turn in the filler strips which have holes 8 of similar shape. The nuts 7 set up the wedge-bolts after they have been positioned with their necks 5 in the openings in the filler strips, and secure the wedge-bolts and the filler strips together. As shown the filler strips are located between the ribs below the plane of the outer edges of the ribs and when the filler strips are in position and the nuts tightened up the nuts are substantially flush with the said plane. Any suitable fairing material 9 may be employed to level up the spaces between the ribs of each pair to the general surface of the skin. Either the ordinary dope known to aeroplane manufacturers or wooden or other strips may be employed for this purpose.

When a wedge-bolt is employed where the ribs 2 pass through a frame member 1, pins 10 are provided which project through the fabric 11 into holes formed in the members 1 to resist end pull on the fabric.

The method of assembly is substantially as follows: The frame members and transverse ribs having been built up to form the necessary framework either with or without the known diagonal bracing, the fabric material is tucked down between each pair of ribs until it reaches as nearly as possible the desired position it assumes in the finished article. The wedge-bolts 4 are then inserted one by one into the space between two ribs 2 with their heads lengthwise of the slot or space between the two ribs. The bolts are then turned until each occupies the position shown in Fig. 3. To assist in this operation the stem 6 of each bolt is provided with a screw driver slot 12 by means of which the wedge-bolt may be turned when in position between the two ribs. When the wedge-bolts are all in position a filler strip is inserted, the square necks of the wedge-bolts passing into the similar shaped openings in the filler strip. The nuts 7 are then screwed onto the stems 6 of the wedge-bolts and the fabric tightly clamped between the filler strips and wedge-bolts and the convex surfaces of the ribs.

The fairing material is then filled in to level up the spaces between the ribs of each pair to the general surface of the skin as hereinbefore referred to.

The fabric may either be applied continuously around the chord of the structure in standard widths of material or it can be applied spanwise in long widths extending from root to tip from one pair of tubes to the next adjacent pair of tubes, lapping one over the other in each spanwise strip. This latter method is easier for making repairs.

In the case of a metal skin, the metal has to be folded and crimped so that it may be sprung into the interstices between the tubes, and forced to lie properly when the wedge-bolts are inserted and snug it into position.

Screws 13 may be used to fasten the edges of the skin fabric or other known means.

While the frame members 2 are shown as comprising hollow tubes, it is obvious that solid shapes could also be used, for example, rounded sticks of spruce, or square sticks of wood or composition. Preferably the frame members 2 are mounted on the ribs by forming recesses in the upper edge of said ribs having undercut sides, and inserting them in the recess, whereby when the wedge members 4 are inserted between the frame members they are supported in the recesses and prevented from coming out by the undercut sides, as will be clear from Figures 3 and 5.

Structures such as I have described may be built entirely of metal or entirely of wood and may be fitted with metal, wood or a textile skin. Composite forms can also be used wherein one has wooden ribs or bulkheads and metal spars, or one can have metal ribs and wooden spars, and so forth.

From the above description it will be seen that I have devised a skin covered structure which will satisfactorily attain the objects of my invention as set out in the preamble to this specification.

What I claim as my invention is:

1. The structure comprising spaced frame members; a plurality of pairs of spaced transverse ribs connecting the frame members, the ribs of each pair having their contiguous sides undercut; a skin fabric covering the ribs and extending into the space between the ribs; wedge members, narrower in one dimension and wider in another dimension than the width of the narrowest part of the space between the ribs, fitted over the skin fabric and between and transversely of said pairs of ribs below said narrowest part; filler strips extending longitudinally of the said pairs of ribs; and means securing the wedge members and the filler strips together to clamp the skin fabric between the wedge members and the adjacent sides of the transverse ribs.

2. A structure comprising spaced frame members; a plurality of pairs of spaced transverse ribs connecting the frame members, the ribs of each pair having their contiguous sides undercut; a skin fabric covering the ribs and extending into the space between the ribs; wedge members, narrower in one dimension and wider in another dimension than the width of the narrowest part of the space between the ribs, fitted over the skin fabric and between and transversely of said pairs of ribs below said narrowest part, said wedge members having threaded stems; filler strips extending longitudinally of the said pairs of ribs above said narrowest part, said filler strips having holes therein through which the stems of the wedge members extend; and threaded means threaded on the stems of the wedge members and engaging the filler strips and securing the wedge members and the filler strips together to clamp the skin fabric between the wedge members and the adjacent sides of the transverse ribs.

3. A structure according to claim 2 in which the holes in the filler strips have a non-rotative engagement with the stems of the wedge members.

4. A structure comprising spaced frame members; a plurality of pairs of spaced transverse ribs connecting the frame members, the ribs of each pair having their contiguous sides substantially concave; a skin fabric covering the ribs and extending into the space between the ribs; wedge members comprising a threaded stem and a head, the head and stem being narrower than the narrowest part of the space between the ribs in one dimension and the head being wider than the said part in another dimension, fitted over the skin fabric and between and transversely of said pairs of ribs below said narrowest part; wedge-like filler strips extending between and longitudinally of the said pairs of ribs above said narrowest part and below the plane of the outer edges of the ribs, said filler strips having holes through which the stems of the wedge members extend; and nuts threaded on the stems of the wedge members and securing the wedge members and the filler strips together to clamp the skin fabric between the wedge members and the adjacent sides of the transverse ribs.

5. A structure comprising spaced frame members; a plurality of pairs of spaced transverse ribs connecting the frame members, the ribs of each pair having their contiguous sides substantially concave; a skin fabric covering the ribs and extending into the space between the ribs; wedge members comprising a threaded stem and a head, the head and stem being narrower than the narrowest part of the space between the ribs in one dimension and the head being wider than the said part in another dimension, fitted over the skin fabric and between and transversely of said pairs of ribs below said narrowest part; wedge-like filler strips extending between and longitudinally of the said pairs of ribs above said narrowest part and below the plane of their outer edges, said filler strips having holes through which the stems of the wedge members extend; nuts threaded on the stems of the wedge members and securing the wedge members and the filler strips together to clamp the skin fabric between the wedge members and the adjacent sides of the transverse ribs; and fairing material filling the spaces between the ribs substantially up to the level of the plane of the upper edges of said ribs.

6. A structure comprising spaced frame members; a plurality of pairs of spaced transverse ribs connecting the frame members, the ribs of each pair having their contiguous sides undercut; a skin fabric covering the ribs and extending into the space between the ribs; wedge members, narrower in one dimension and wider in another dimension than the width of the narrowest part of the space between the ribs, fitted over the skin fabric and between and transversely of said pairs of ribs below said narrowest part; filler strips extending longitudinally of the said pairs of ribs above said narrowest part; means securing the wedge members and the filler strips together to clamp the skin fabric between the wedge members and the adjacent sides of the transverse ribs; and centering pins extending from the underside of the wedge members and passing through the fabric.

7. A structure comprising spaced frame members; a plurality of pairs of spaced transverse ribs connecting the frame members, the ribs of each pair having their contiguous sides undercut; a skin fabric covering the ribs and extending into the space between the ribs; wedge members, narrower in one dimension and wider in another dimension than the width of the narrowest part of the space between the ribs, fitted over the skin fabric and between and transversely of said pairs of ribs below said narrowest part; filler strips extending longitudinally of the said pairs of ribs above said narrowest part; means securing the wedge members and the filler strips together to clamp the skin fabric between the wedge members and the adjacent sides of the transverse ribs; and centering pins extending from the underside of the wedge members and passing through the fabric, the frame members being formed with holes to receive the pins.

8. A structure comprising spaced frame members; a plurality of pairs of spaced transverse ribs connecting the frame members, the ribs of each pair having their contiguous sides undercut; a skin fabric covering the ribs and extending into the space between the ribs; wedge members, narrower on one dimension and wider in another dimension than the width of the narrowest part of the space between the ribs, fitted over the skin fabric and between and transversely of said pairs of ribs below said narrowest part, said wedge members having threaded stems, having slotted ends for turning the wedge members in the space between the ribs; filler strips extending longitudinally of the said pairs of ribs above said narrowest part, said filler strips having holes therein through which the stems of the wedge members extend; and threaded means threaded on the stems of the wedge members and engaging the filler strips and securing the wedge members and the filler strips together to clamp the skin fabric between the wedge members and the adjacent sides of the transverse ribs.

9. A structure comprising spaced frame members; a plurality of pairs of tubular transverse ribs connecting the frame members, the ribs of each pair having their contiguous sides undercut; a skin fabric covering the ribs and extending into the space between the ribs, wedge members, narrower in one dimension and wider in another dimension than the width of the narrowest part of the space between the ribs, fitted over the skin fabric and between and transversely of said pairs of ribs below said narrowest part; filler strips extending longitudinally of the said pairs of ribs; and means securing the wedge members and the filler strips together to clamp the skin fabric between the wedge members and the adjacent sides of the transverse ribs.

10. A structure comprising spaced frame members having recesses in the upper edge thereof having undercut sides; a plurality of pairs of spaced transverse ribs seated in said recesses and held therein by the undercut sides, the ribs of each pair having their contiguous sides undercut; a skin fabric covering the ribs and extending into the space between the ribs; wedge members, narrower in one dimension and wider in another dimension than the width of the narrowest part of the space between the ribs, fitted over the skin fabric and between and transversely of said pairs of ribs below said narrowest part; filler strips extending longitudinally of the said pairs of ribs; and means securing the wedge members and the filler strips together to clamp the skin fabric between the wedge members and the adjacent sides of the transverse ribs.

ADAM CRAIGON.